March 23, 1926.
J. C. HAGGART, JR
VEHICLE CHASSIS
Filed May 19, 1924
1,578,026
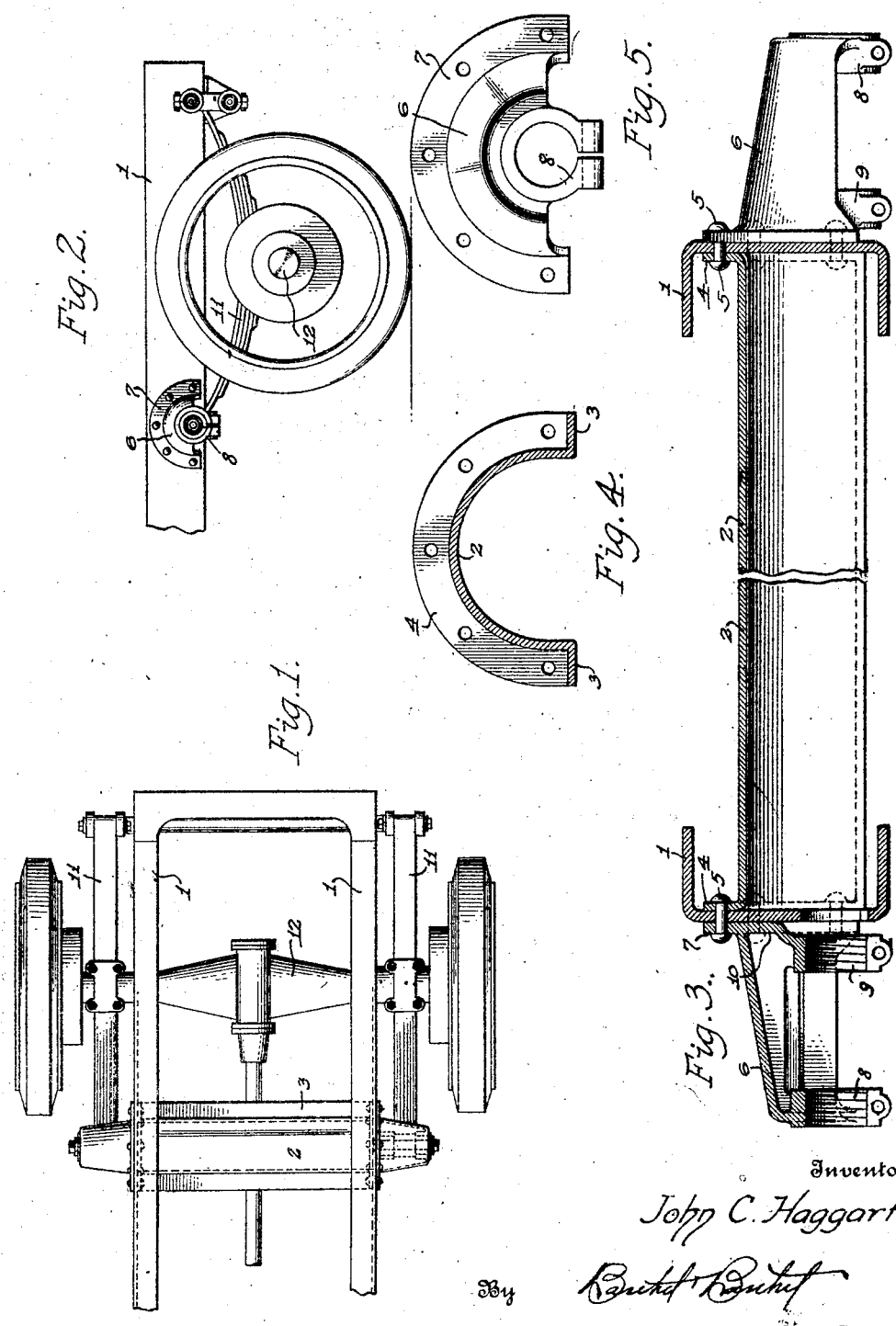
Inventor
John C. Haggart Jr,
By
Attorneys Patented Mar. 23, 1926.

1,578,026

UNITED STATES PATENT OFFICE.

JOHN C. HAGGART, JR., OF ALMA, MICHIGAN, ASSIGNOR, BY MESNE ASSIGNMENTS, TO DETROIT PATENTS HOLDING COMPANY, OF DETROIT, MICHIGAN, A CORPORATION OF MICHIGAN.

VEHICLE CHASSIS.

Application filed May 19, 1924. Serial No. 714,248.

*To all whom it may concern:*

Be it known that I, JOHN C. HAGGART, Jr., a citizen of the United States, residing at Alma, in the county of Gratiot and State of Michigan, have invented certain new and useful Improvements in Vehicle Chassis, of which the following is a specification, reference being had therein to the accompanying drawings.

This invention relates to a vehicle chassis, and has special reference to a cross member and spring brackets adapted to form part of a chassis.

My invention aims to provide, as new articles of manufacture, two members that may be advantageously used in connection with an automobile chassis for adding strength and rigidity to the chassis where the rear springs support the chassis relative to a rear axle assembly. One of the members is mounted in the chassis and of such configuration that it forms a rigid transverse member that will brace the sides of the chassis. The other members are in the form of brackets attached to the chassis by the same fastening means that holds the transverse or cross member, said brackets being practically a continuation of the cross member. The brackets have a hood-like configuration into which extend the forward ends of the rear springs, and now means is employed for articulating the brackets and springs, as will be brought out in a companion application filed under even date.

My improvements will be hereinafter specifically described and then claimed, and reference will now be had to the drawing wherein—

Figure 1 is a plan of the vehicle chassis showing my improvements;

Fig. 2 is a side elevation of the same;

Fig. 3 is an enlarged cross sectional view of the chassis;

Fig. 4 is a detail sectional view of one of the spring brackets, and

Fig. 5 is an end view of the same.

In the drawing, 1 denotes chassis side frames which are ordinarily channel shaped with the top and bottom flanges of said channels projecting inwardly, as best shown in Fig. 3. Mounted in these chassis side frames is a substantially semi-cylindrical or inverted trough shaped cross member 2 having longitudinal lateral flanges 3 and end flanges 4, the flanges 3 adding rigidity to the cross member and the flanges 4 permitting of the ends of the cross member abutting the frames 1 and being riveted or otherwise attached thereto, as at 5. This cross member constitutes a new article of manufacture and positively braces the frames 1 adjacent the rear end of the chassis.

Other articles of manufacture are hood shaped spring brackets 6 which have the inner ends thereof provided with flanges 7 attached to the outer walls of the frames 1 by the same fastening means 5 employed for holding the ends of the cross member.

Each spring bracket tapers inwardly from its inner end to its outer end and at the outer end of the bracket is a split contractible bearing 8 alining with a similar bearing 9 at the inner end of the bracket, said inner bearing supported by an end wall 10 of the bracket. These bearings are adapted to be clamped about bushings adapted for holding a shackle or spring pin, so that the forward end of a spring 11 may be anchored within the bracket and its connection protected by the hood-like configuration of the bracket.

The springs 11 are of the usual form attached to the rear end of the chassis and supported by a rear axle assembly 12, and with the bracket 6 practically a continuation of the cross member 2, the forward ends of the side springs 11 are well braced relative to the chassis with no danger of the chassis being warped or distorted by reason of any spring connection when the chassis is under load conditions.

One embodiment of my invention has been illustrated but it is to be understood that the structural elements are susceptible to such variations and modifications as fall within the scope of the appended claim.

What I claim is:—

In a vehicle chassis, side frames, a cross member having flanged ends extending into said side frames, spring brackets between the planes of the upper and lower edges of said frames, said spring brackets being substantially hood shaped and formed with split contractible bearings for supporting the ends of springs under said brackets, and means extending through said frame connecting the flanged ends of said cross member and spring brackets to said frames.

In testimony whereof I affix my signature.

JOHN C. HAGGART, JR.